(12) United States Patent
Yin et al.

(10) Patent No.: US 11,762,239 B2
(45) Date of Patent: Sep. 19, 2023

(54) DISPLAY PANEL AND FABRICATING METHOD THEREOF

(71) Applicant: Shenzhen China Star Optoelectronics Semiconductor Display Technology Co., Ltd., Shenzhen (CN)

(72) Inventors: Yongming Yin, Shenzhen (CN); Dongze Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 668 days.

(21) Appl. No.: 16/620,942

(22) PCT Filed: Nov. 25, 2019

(86) PCT No.: PCT/CN2019/120658
§ 371 (c)(1),
(2) Date: Dec. 10, 2019

(87) PCT Pub. No.: WO2021/088149
PCT Pub. Date: May 14, 2021

(65) Prior Publication Data
US 2021/0200038 A1 Jul. 1, 2021

(30) Foreign Application Priority Data
Nov. 8, 2019 (CN) .......................... 201911084655.0

(51) Int. Cl.
| | |
|---|---|
| *G02F 1/1368* | (2006.01) |
| *C23C 18/12* | (2006.01) |
| *G02F 1/1335* | (2006.01) |
| *B41J 2/01* | (2006.01) |
| *C09D 11/033* | (2014.01) |

(Continued)

(52) U.S. Cl.
CPC .......... *G02F 1/133614* (2021.01); *B41J 2/01* (2013.01); *C09D 11/033* (2013.01);
(Continued)

(58) Field of Classification Search
CPC ............. G02F 1/133614; G02F 1/1368; G02F 1/1335; B41J 2/01; C09D 11/033;
(Continued)

(56) References Cited

U.S. PATENT DOCUMENTS

| | | | |
|---|---|---|---|
| 2019/0129225 A1 | 5/2019 | Lee et al. | |
| 2019/0171067 A1 | 6/2019 | Lee | |

FOREIGN PATENT DOCUMENTS

| | | | |
|---|---|---|---|
| CN | 106292066 | 1/2017 | |
| CN | 106292066 A | * 1/2017 | ........... G02F 1/1336 |

(Continued)

*Primary Examiner* — William P Fletcher, III
(74) *Attorney, Agent, or Firm* — PV IP PC; Wei Te Chung; Zhigang Ma

(57) ABSTRACT

A display panel and a fabricating method thereof are provided. The fabricating method of the display panel has steps of: providing a substrate; forming a light conversion layer on the substrate, wherein material of the light conversion layer has a perovskite structural material with a chemical formula of $ABX_3$, wherein A represents an inorganic element, B represents an inorganic element, and X represents a halogen; performing a patterning step on the light conversion layer by an antisolvent method, wherein the light conversion layer forms a plurality of light conversion patterns; and forming a pixel layer on the light conversion layer, wherein the pixel layer has a plurality of pixel units, and the plurality of pixel units are respectively aligned with the plurality of light conversion patterns. The fabricating method can reduce a dark state brightness of the display panel, thereby improving contrast of the display panel.

16 Claims, 2 Drawing Sheets

(51) Int. Cl.
  *C09D 11/037* (2014.01)
  *C09D 11/322* (2014.01)
  *C09D 11/36* (2014.01)
  *C09D 11/50* (2014.01)
  *C09K 11/08* (2006.01)

(52) U.S. Cl.
  CPC .......... *C09D 11/037* (2013.01); *C09D 11/322* (2013.01); *C09D 11/36* (2013.01); *C09D 11/50* (2013.01); *C09K 11/08* (2013.01); *C23C 18/1204* (2013.01); *C23C 18/1283* (2013.01); *C23C 18/1295* (2013.01); *G02F 1/1368* (2013.01)

(58) Field of Classification Search
  CPC ..... C09D 11/037; C09D 11/322; C09D 11/36; C09D 11/50; C09K 11/08; C23C 18/1204; C23C 18/1283; C23C 18/1295
  See application file for complete search history.

(56) References Cited

FOREIGN PATENT DOCUMENTS

| | | | | |
|---|---|---|---|---|
| CN | 106876562 | | 6/2017 | |
| CN | 107118618 | | 9/2017 | |
| CN | 108389979 | | 8/2018 | |
| CN | 108389979 A | * | 8/2018 | ......... H01L 27/3206 |
| CN | 109135725 | | 1/2019 | |
| CN | 109240002 | | 1/2019 | |
| CN | 110212098 A | * | 9/2019 | |
| CN | 209496866 | | 10/2019 | |

* cited by examiner

DISPLAY PANEL AND FABRICATING METHOD THEREOF

CROSS REFERENCE TO RELATED APPLICATION

This application is a National Phase of PCT Patent Application No. PCT/CN2019/120658 having International filing date of Nov. 25, 2019, which claims the benefit of priority of Chinese Patent Application No. 201911084655.0 filed on Nov. 8, 2019. The contents of the above applications are all incorporated by reference as if fully set forth herein in their entirety.

FIELD AND BACKGROUND OF THE INVENTION

The present disclosure relates to displays, and more particularly to a display panel and a fabricating method thereof.

A perovskite material has been applied in a light conversion layer, wherein the light conversion layer is formed in a whole surface in the backlight module. When illuminated by a light source located below the backlight module, a non-pixel effective light emitting area will also have a certain amount of light, which will cause dark state brightness of the display panel to increase, thereby reducing contrast of the display panel.

Therefore, it is necessary to provide a display panel and a fabricating method thereof to solve problems existing in the conventional technologies.

SUMMARY OF THE INVENTION

In view of this, the present disclosure provides a display panel and a fabricating method thereof to solve a problem that contrast of the display panel in the conventional technologies decreases.

An object of the present disclosure is to provide a display panel and a fabricating method thereof, which can improve contrast of the display panel.

To achieve the above object of the present disclosure, an embodiment of the present disclosure provides a fabricating method of a display panel comprising steps of: providing a substrate; forming a light conversion layer on the substrate, wherein material of the light conversion layer comprises a perovskite structural material with a chemical formula of $ABX_3$, wherein A represents an inorganic element, B represents an inorganic element, and X represents a halogen, wherein the step of forming the light conversion layer comprises: coating a perovskite precursor solution on the substrate; and performing a low-temperature vacuum drying treatment on the perovskite precursor solution to form the light conversion layer on the substrate; performing a patterning step on the light conversion layer by an antisolvent method, wherein the light conversion layer forms a plurality of light conversion patterns, and an antisolvent of the antisolvent method comprises at least one of chlorobenzene and toluene; and forming a pixel layer on the light conversion layer, wherein the pixel layer comprises a plurality of pixel units, and the plurality of pixel units are respectively aligned with the plurality of light conversion patterns.

In an embodiment of the present disclosure, a treating temperature of the low-temperature vacuum drying treatment is between 90 and 130° C. for 5 to 15 minutes.

In an embodiment of the present disclosure, the patterning step comprises steps of: defining positions of the plurality of light conversion patterns of the light conversion layer; inkjet printing the antisolvent at the positions of the plurality of light conversion patterns; and performing a low-temperature vacuum drying process on the anti-solvent to form the plurality of light conversion patterns.

In an embodiment of the present disclosure, a treating temperature of the low-temperature vacuum drying treatment is between 90 and 130° C. for 5 to 15 minutes.

In an embodiment of the present disclosure, the A comprises at least one of sodium, potassium, cesium, and barium.

In an embodiment of the present disclosure, the B comprises at least one of copper, nickel, cobalt, iron, manganese, chromium, cadmium, tin, and lead.

In an embodiment of the present disclosure, the X comprises at least one of chlorine, bromine, and iodine.

To achieve the above object of the present disclosure, an embodiment of the present disclosure provides a fabricating method of a display panel comprising steps of: providing a substrate; forming a light conversion layer on the substrate, wherein material of the light conversion layer comprises a perovskite structural material with a chemical formula of $ABX_3$, wherein A represents an inorganic element, B represents an inorganic element, and X represents a halogen; performing a patterning step on the light conversion layer by an antisolvent method, wherein the light conversion layer forms a plurality of light conversion patterns; and forming a pixel layer on the light conversion layer, wherein the pixel layer comprises a plurality of pixel units, and the plurality of pixel units are respectively aligned with the plurality of light conversion patterns.

In an embodiment of the present disclosure, the step of forming the light conversion layer comprises steps of: coating a perovskite precursor solution on the substrate; and performing a low-temperature vacuum drying treatment on the perovskite precursor solution to form the light conversion layer on the substrate.

In an embodiment of the present disclosure, a treating temperature of the low-temperature vacuum drying treatment is between 90 and 130° C. for 5 to 15 minutes.

In an embodiment of the present disclosure, an antisolvent of the antisolvent method comprises at least one of chlorobenzene and toluene.

In an embodiment of the present disclosure, the patterning step comprises steps of: defining positions of the plurality of light conversion patterns of the light conversion layer; inkjet printing the antisolvent at the positions of the plurality of light conversion patterns; and performing a low-temperature vacuum drying process on the anti-solvent to form the plurality of light conversion patterns.

In an embodiment of the present disclosure, a treating temperature of the low-temperature vacuum drying treatment is between 90 and 130° C. for 5 to 15 minutes.

In an embodiment of the present disclosure, the A comprises at least one of sodium, potassium, cesium, and barium.

In an embodiment of the present disclosure, the B comprises at least one of copper, nickel, cobalt, iron, manganese, chromium, cadmium, tin, and lead.

In an embodiment of the present disclosure, the X comprises at least one of chlorine, bromine, and iodine.

Further, another embodiment of the present disclosure provides a display panel comprising: a substrate, a light conversion layer, and a pixel layer. The light conversion layer is disposed on the substrate, wherein the light conversion layer comprises a plurality of light conversion patterns formed by an antisolvent method, wherein material of the light conversion layer comprises a perovskite structural material with a chemical formula of $ABX_3$, wherein A represents an inorganic element, B represents an inorganic element, and X represents a halogen. The pixel layer is disposed on the light conversion layer, wherein the pixel layer comprises a plurality of pixel units, and the plurality of pixel units are respectively aligned with the plurality of light conversion patterns.

Compared with the conventional technologies, in the display panel and the fabricating method thereof, a plurality of light conversion patterns aligned with the plurality of pixel units are formed, so as to prevent or reduce light from passing through a non-pixel effective light emitting area, such that dark state brightness of the display panel can be reduced, which further improves contrast of the display panel.

To make the above description of the present disclosure more clearly comprehensible, it is described in detail below in examples of preferred embodiments with the accompanying drawings.

DESCRIPTION OF SPECIFIC EMBODIMENTS OF THE INVENTION

Following description of the various embodiments is provided to illustrate the specific embodiments of the present disclosure. Furthermore, directional terms mentioned in the present disclosure, such as upper, lower, top, bottom, front, rear, left, right, inner, outer, side, surrounding, central, horizontal, horizontal, vertical, longitudinal, axial, radial, an uppermost layer or a lowermost layer, etc., only refer to a direction of the accompanying figures. Therefore, the used directional terms are used to describe and understand the present disclosure, but the present disclosure is not limited thereto.

Figure 1:
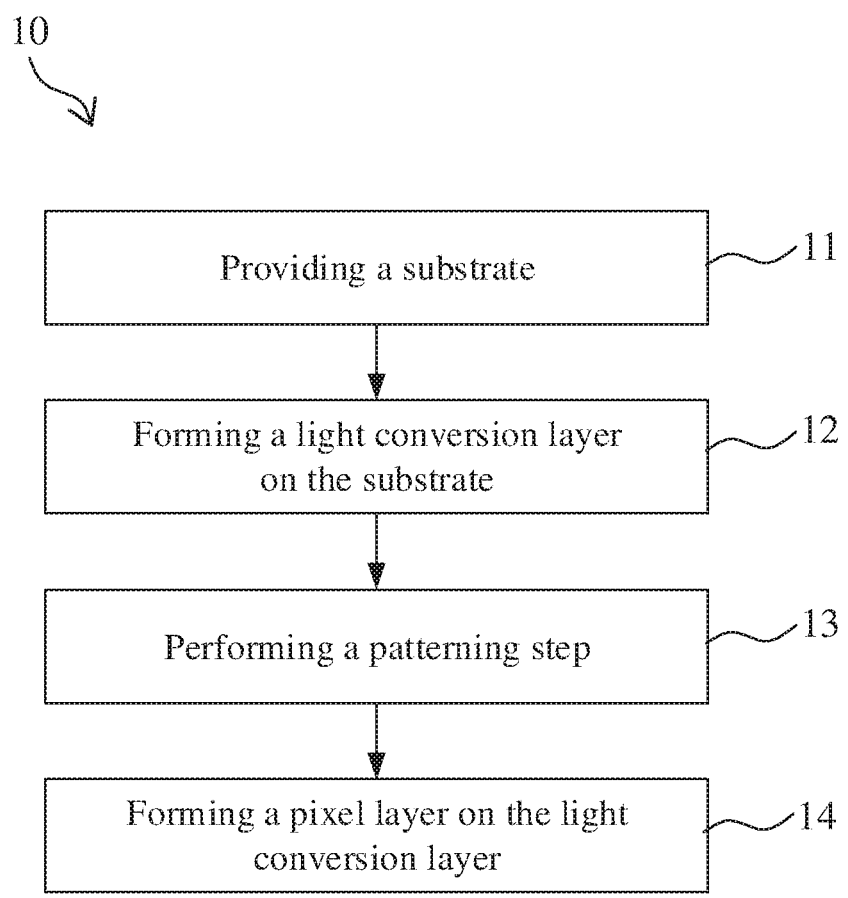
FIG. 1 is a flowchart of a fabricating method of a display panel according to an embodiment of the present disclosure.

Referring to FIG. 1, in an embodiment of the present disclosure, a fabricating method 10 of a display panel comprises steps 11 to 14 of: providing a substrate (step 11); forming a light conversion layer on the substrate, wherein material of the light conversion layer comprises a perovskite structural material with a chemical formula of $ABX_3$, wherein A represents an inorganic element, B represents an inorganic element, and X represents a halogen (step 12); performing a patterning step on the light conversion layer by an antisolvent method, wherein the light conversion layer forms a plurality of light conversion patterns (step 13); and forming a pixel layer on the light conversion layer, wherein the pixel layer comprises a plurality of pixel units, and the plurality of pixel units are respectively aligned with the plurality of light conversion patterns (step 14). Implementation details and principles of the above steps of an embodiment of the present disclosure will be described one by one in detail below.

In an embodiment of the present disclosure, the fabricating method 10 of the display panel has a step 11 of: providing a substrate. In step 11, the substrate can be used to support a structure required in the display panel, such as a light conversion layer and a pixel layer described later. In one embodiment, the substrate can also be used to support other components in the display panel, such as a diffusion sheet, a brightness enhancement sheet, a polarizer, or a liquid crystal layer. In another embodiment, the substrate includes a flexible substrate, a transparent substrate, or a flexible transparent substrate.

In an embodiment of the present disclosure, the fabricating method 10 of the display panel has a step 12 of: forming a light conversion layer on the substrate, wherein material of the light conversion layer comprises a perovskite structural material with a chemical formula of $ABX_3$, wherein A represents an inorganic element, B represents an inorganic element, and X represents a halogen. In step 12, the light conversion layer can be formed on the substrate by, for example, coating or deposition. In an embodiment, a perovskite precursor solution is coated on the substrate, and then a low-temperature vacuum drying treatment is performed on the perovskite precursor solution to form the light conversion layer on the substrate. In an example, a treating temperature of the low-temperature vacuum drying treatment is between 90 and 130° C. (for example, 100° C., 110° C., or 120° C.) for 5 to 15 minutes (for example, 6, 7, 8, 10, 12, 13, or 14 minutes). In an embodiment, the A comprises at least one of sodium, potassium, cesium, and barium. In another embodiment, the B includes at least one of copper, nickel, cobalt, iron, manganese, chromium, cadmium, tin, and lead. In yet another embodiment, the X includes at least one of chlorine, bromine, and iodine.

In an embodiment of the present disclosure, the fabricating method 10 of the display panel has a step 13 of: performing a patterning step on the light conversion layer by an antisolvent method, wherein the light conversion layer forms a plurality of light conversion patterns. In step 13, positions of the plurality of light conversion patterns are mainly determined by an anti-solvent method. More specifically, only the light conversion layer treated by the antisolvent method can achieve effective light emission, and other untreated parts can be used to absorb light. In an embodiment, the positions of the plurality of light conversion patterns of the light conversion layer are first defined. Thereafter, an antisolvent is inkjet printed on the positions of the plurality of light conversion patterns. Finally, a low-temperature vacuum drying treatment is performed on the anti-solvent to form the plurality of light conversion patterns. In an example, a treating temperature of the low-temperature vacuum drying treatment is between 90 and 130° C. (for example, 100° C., 110° C., or 120° C.) for 5 to 15 minutes (for example, 6, 7, 8, 10, 12, 13, or 14 minutes).

In an embodiment of the present disclosure, the fabricating method 10 of the display panel has a step 14 of: forming a pixel layer on the light conversion layer, wherein the pixel layer comprises a plurality of pixel units, and the plurality of pixel units are respectively aligned with the plurality of light conversion patterns. In step 14, the pixel layer can be formed using a known process of a pixel layer, for example. In an embodiment, the plurality of pixel units can be used to display red, green, or blue, for example.

From above, because the plurality of pixel units are aligned with the plurality of light conversion patterns, respectively, only the light passing through the light conversion patterns can reach the positions of the plurality of pixel units to display colors, and the light that does not pass through the light conversion patterns will be absorbed. Therefore, the display panel fabricated by the fabricating method of the display panel according to an embodiment of the present disclosure can prevent or reduce light from passing through a non-pixel effective light emitting area, and the dark state brightness of the display panel can be reduced, which further improves the contrast of the display panel.

Figure 2:
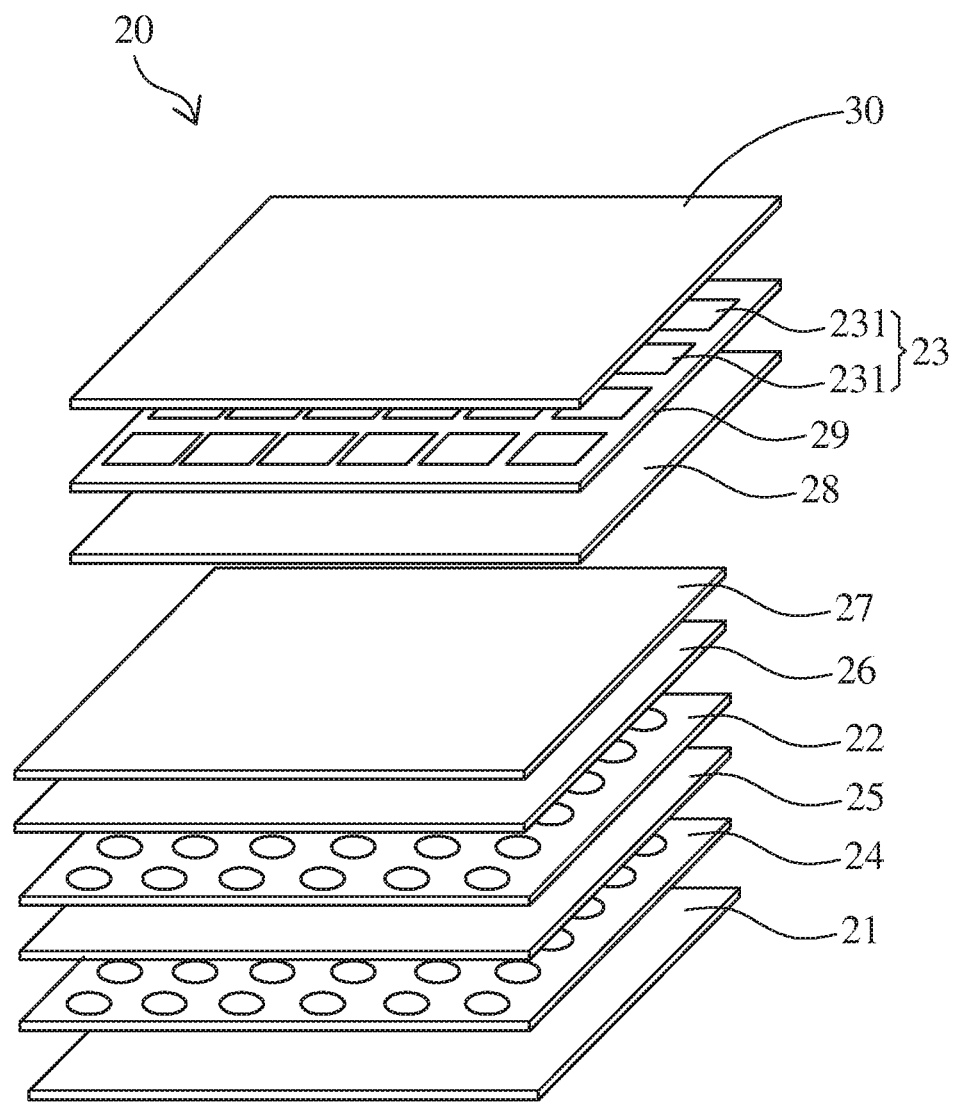
FIG. 2 is an exploded view of a display panel according to an embodiment of the present disclosure.

Referring to FIG. 2, the present disclosure further provides a display panel 20 comprising: a substrate 21, a light conversion layer 22, and a pixel layer 23. The light conversion layer 22 is disposed on the substrate 21, wherein the light conversion layer 22 comprises a plurality of light conversion patterns 221 formed by an antisolvent method, wherein material of the light conversion layer 22 comprises a perovskite structural material with a chemical formula of $ABX_3$, wherein A represents an inorganic element, B represents an inorganic element, and X represents a halogen. The pixel layer 23 is disposed on the light conversion layer 22, wherein the pixel layer 23 comprises a plurality of pixel units 231, and the plurality of pixel units are respectively aligned with the plurality of light conversion patterns 221.

In an embodiment, the display panel 20 can further comprises a light emitting layer (for example, including a blue LED and potassium fluorosilicate fluorescent powder (KSF fluorescent powder)) 24, a diffusion sheet 25, a brightness enhancement sheet (BEF) 26, a dual brightness enhancement sheet (DBEF) 27, a lower polarizer 28, a TFT array and color filter substrate 29 and an upper polarizer 30, wherein the pixel layer 23 is disposed in the TFT array and color filter substrate 28.

In an embodiment, the display panel 20 of the present disclosure can be fabricated by the fabricating method 10 of the display panel of the present disclosure, for example.

The present disclosure has been described in relative embodiments described above, but the above embodiments are merely examples for implementing the present disclosure. It is noted that the disclosed embodiments do not limit the scope of the disclosure. On the contrary, modifications and equal settings included in the spirit and scope of the claims are all included in the scope of the present disclosure.

What is claimed is:

1. A fabricating method of a display panel, comprising steps of:
   providing a substrate;
   forming a light conversion layer on the substrate, wherein material of the light conversion layer comprises a perovskite structural material with a chemical formula of $ABX_3$, wherein A represents an inorganic element, B represents an inorganic element, and X represents a halogen, wherein the step of forming the light conversion layer comprises:
   coating a perovskite precursor solution on the substrate; and
     performing a low-temperature vacuum drying treatment with a treating temperature ranged between 90 and 130° C. on the perovskite precursor solution to form the light conversion layer on the substrate;
     performing a patterning step on the light conversion layer by an antisolvent method, wherein the light conversion layer forms a plurality of light conversion patterns, and an antisolvent of the antisolvent method comprises at least one of chlorobenzene and toluene; and
   forming a pixel layer on the light conversion layer, wherein the pixel layer comprises a plurality of pixel units, and the plurality of pixel units are respectively aligned with the plurality of light conversion patterns.

2. The fabricating method of the display panel according to claim 1, wherein a treating time of the low-temperature vacuum drying treatment is between 5 to 15 minutes.

3. The fabricating method of the display panel according to claim 1, wherein the patterning step comprises steps of:
   defining positions of the plurality of light conversion patterns of the light conversion layer;
   inkjet printing the antisolvent at the positions of the plurality of light conversion patterns; and
   performing a low-temperature vacuum drying process with a treating temperature ranged between 90 and 130° C. on the anti-solvent to form the plurality of light conversion patterns.

4. The fabricating method of the display panel according to claim 3, wherein a treating time of the low-temperature vacuum drying process on the anti-solvent is between 5 to 15 minutes.

5. The fabricating method of the display panel according to claim 1, wherein the A comprises at least one of sodium, potassium, cesium, and barium.

6. The fabricating method of the display panel according to claim 1, wherein the B comprises at least one of copper, nickel, cobalt, iron, manganese, chromium, cadmium, tin, and lead.

7. The fabricating method of the display panel according to claim 1, wherein the X comprises at least one of chlorine, bromine, and iodine.

8. A fabricating method of a display panel, comprising steps of:
   providing a substrate;
   forming a light conversion layer on the substrate, wherein material of the light conversion layer comprises a perovskite structural material with a chemical formula of $ABX_3$, wherein A represents an inorganic element, B represents an inorganic element, and X represents a halogen;
   performing a patterning step on the light conversion layer by an antisolvent method, wherein the light conversion layer forms a plurality of light conversion patterns; and
   forming a pixel layer on the light conversion layer, wherein the pixel layer comprises a plurality of pixel units, and the plurality of pixel units are respectively aligned with the plurality of light conversion patterns.

9. The fabricating method of the display panel according to claim 8, wherein the step of forming the light conversion layer comprises steps of:
   coating a perovskite precursor solution on the substrate; and
   performing a low-temperature vacuum drying treatment with a treating temperature ranged between 90 and 130° C. on the perovskite precursor solution to form the light conversion layer on the substrate.

10. The fabricating method of the display panel according to claim 9, wherein a treating time of the low-temperature vacuum drying treatment is between 5 to 15 minutes.

11. The fabricating method of the display panel according to claim 8, wherein an antisolvent of the antisolvent method comprises at least one of chlorobenzene and toluene.

12. The fabricating method of the display panel according to claim 8, wherein the patterning step comprises steps of:
   defining positions of the plurality of light conversion patterns of the light conversion layer;
   inkjet printing the antisolvent at the positions of the plurality of light conversion patterns; and
   performing a low-temperature vacuum drying process with a treating temperature ranged between 90 and 130° C. on the anti-solvent to form the plurality of light conversion patterns.

13. The fabricating method of the display panel according to claim 12, wherein a treating time of the low-temperature vacuum drying process on the anti-solvent is between 5 to 15 minutes.

14. The fabricating method of the display panel according to claim 8, wherein the A comprises at least one of sodium, potassium, cesium, and barium.

15. The fabricating method of the display panel according to claim 8, wherein the B comprises at least one of copper, nickel, cobalt, iron, manganese, chromium, cadmium, tin, and lead.

16. The fabricating method of the display panel according to claim 8, wherein the X comprises at least one of chlorine, bromine, and iodine.

\* \* \* \* \*